US010487715B2

(12) United States Patent
De Smet et al.

(10) Patent No.: US 10,487,715 B2
(45) Date of Patent: Nov. 26, 2019

(54) REGENERATION OF PARTICULATE FILTERS IN AUTONOMOUSLY CONTROLLABLE VEHICLES

(71) Applicant: Ford Global Technologies, LLC, Dearborn, MI (US)

(72) Inventors: Frederik De Smet, Genk (BE); Christoph Boerensen, Aachen (DE); Elmar Riesmeier, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 15/229,631

(22) Filed: Aug. 5, 2016

(65) Prior Publication Data
US 2017/0051652 A1 Feb. 23, 2017

(30) Foreign Application Priority Data

Aug. 20, 2015 (DE) .................. 10 2015 215 867
Aug. 20, 2015 (DE) .................. 10 2015 215 868

(51) Int. Cl.
*F01N 9/00* (2006.01)
*F01N 3/023* (2006.01)
*F01N 3/033* (2006.01)
*F01N 3/035* (2006.01)
(Continued)

(52) U.S. Cl.
CPC ............ *F01N 9/002* (2013.01); *F01N 3/023* (2013.01); *F01N 3/035* (2013.01); *F01N 11/00* (2013.01); *F01N 3/2066* (2013.01); *F01N 2550/04* (2013.01); *F01N 2900/08* (2013.01); *F01N 2900/10* (2013.01); *F01N 2900/12* (2013.01); *F01N 2900/1602* (2013.01); *Y02A 50/2325* (2018.01); *Y02T 10/47* (2013.01)

(58) Field of Classification Search
None
See application file for complete search history.

(56) References Cited

U.S. PATENT DOCUMENTS 6,009,368 A * 12/1999 Labuhn ............. B60K 31/0008
123/352
7,698,888 B2  4/2010 Wyatt
8,683,786 B2  4/2014 Ruona et al.
(Continued)

FOREIGN PATENT DOCUMENTS

DE    102007027182 A1   12/2008

*Primary Examiner* — Kevin P Mahne
(74) *Attorney, Agent, or Firm* — Geoffrey Brumbaugh; McCoy Russell LLP

(57) ABSTRACT

Embodiments for regeneration a particulate filter in a motor vehicle having a self-control mode for the autonomous control of a drive mode and having a diesel particulate filter disposed in the exhaust system of a diesel engine of the motor vehicle are provided. In one example, a method for protecting the diesel particulate filter from overheating and premature aging comprises: starting the self-control mode, starting/verifying a regeneration process of the diesel particulate filter with combustion of the soot particles adsorbed on the diesel particulate filter, and monitoring a temperature of the diesel particulate filter and/or of the exhaust gas directed through the diesel particulate filter during the regeneration process. Depending on a monitoring result of the monitoring, a control for the self-control mode of the motor vehicle can be adjusted.

18 Claims, 4 Drawing Sheets

(51) Int. Cl.
*F01N 11/00* (2006.01)
*F01N 3/20* (2006.01)

(56) References Cited

U.S. PATENT DOCUMENTS

| | | | |
|---|---|---|---|
| 8,762,028 B2 | 6/2014 | Kim et al. | |
| 2003/0145582 A1* | 8/2003 | Bunting | F01N 3/023 60/297 |
| 2004/0204289 A1* | 10/2004 | Inoue | B60W 10/06 477/107 |
| 2009/0019838 A1* | 1/2009 | Marlett | B60W 30/18054 60/287 |
| 2012/0204537 A1 | 8/2012 | Dea et al. | |
| 2012/0260633 A1* | 10/2012 | Masuda | F01N 3/0235 60/274 |
| 2013/0008162 A1* | 1/2013 | Ruona | F01N 3/023 60/605.1 |
| 2013/0152551 A1* | 6/2013 | Kotnish | F02D 41/029 60/274 |
| 2013/0174536 A1 | 7/2013 | Yacoub | |
| 2013/0211656 A1 | 8/2013 | An et al. | |
| 2014/0195074 A1* | 7/2014 | Hunt | B60W 50/08 701/2 |
| 2016/0075341 A1* | 3/2016 | Arvidsson | G01S 19/42 701/22 |

\* cited by examiner

REGENERATION OF PARTICULATE FILTERS IN AUTONOMOUSLY CONTROLLABLE VEHICLES

CROSS-REFERENCE TO RELATED APPLICATIONS

This application claims priority to German Patent Application No. 102015215867.5, filed Aug. 20, 2015, and to German Patent Application No. 102015215868.3, filed Aug. 20, 2015, the entire contents of each of which is hereby incorporated by reference for all purposes.

FIELD

The disclosure relates to a method and a control device for the regeneration of a particulate filter in a vehicle having an autonomous drive mode.

BACKGROUND/SUMMARY

The use of particulate filters in the exhaust gas aftertreatment of motor vehicles has become indispensable with respect to complying with increasingly more stringent emission standards. A particulate filter in the exhaust system of a diesel or gasoline engine of a motor vehicle filters the solids contained in the exhaust gas, in particular the soot, and stores them via embedding on the surface or in the interior of the walls of the particulate filter.

The solids embedded in the particulate filter increase the flow resistance and, therefore, the exhaust gas back pressure in the exhaust system, which impairs the engine performance and the fuel consumption of the motor vehicle.

In order to restore the filter efficiency and the exhaust gas back pressure to a suitable value, the particulate filter is regenerated as soon as a certain soot mass has become embedded. The regeneration of the filter is accomplished by burning the embedded particulates. For this purpose, a suitable starting temperature may be employed, which for gasoline particulate filters, may typically be approximately 600° C., as well as an excess of oxygen in the exhaust gas fed to the gasoline particulate filter.

Due to the high temperatures typically prevailing in the exhaust system of gasoline engines, it is possible that a regeneration of a gasoline particulate filter will spontaneously occur in the drive mode. For example, the regeneration can set in at temperatures in the exhaust system above 600° C. as a result of the driver lifting off the gas pedal, since, in this case, a supply of fuel to the internal combustion engine is briefly interrupted, and so the exhaust gas can contain an excess of oxygen, which promotes the burning of soot in the gasoline particulate filter.

When a particulate filter is greatly loaded with soot, there is a risk that an either spontaneously occurring or actively started regeneration of the particulate filter will generate so much exothermic heat that, due to the overheating, the particulate filter will undergo accelerated aging or can even become damaged. A damaged particulate filter can cause consequential damage to other components, in particular, in the engine and exhaust system. In addition, such events are stored in the on-board diagnostics. The presence of such memory entries can be signaled to the driver or can be detected in the workshop and, depending on the requirement of the relevant emission standard, can prompt a repair or a replacement of the particulate filter.

The inventors herein have recognized the above issues and provide systems and methods to at least partly address them. In one example, a method for protecting a diesel particulate filter from overheating and premature aging, wherein the diesel particulate filter is disposed in the exhaust system of a diesel engine of a motor vehicle, and wherein the motor vehicle has a self-control mode for the autonomous control of a drive mode of the motor vehicle, includes starting the self-control mode, starting or verifying a regeneration process of the diesel particulate filter with burning of the soot particulates adsorbed on the diesel particulate filter, monitoring a temperature of the diesel particulate filter and/or of the exhaust gas directed through the diesel particulate filter during the regeneration process, and responsive to a monitoring result of the monitoring, adjusting a control of the self-control mode of the motor vehicle.

The self-control mode and the regeneration process can be started in the method for protecting the diesel particulate filter from thermal overheating, which is carried out in the motor vehicle comprising a diesel engine and a diesel particulate filter. For example, it is possible to first wait for the self-control mode to be started, e.g., by the driver, and then, in the self-control mode, to start the regeneration process and monitor said regeneration process, for example, by the stated temperature measurements. It is also possible, for example, to begin or carry out the method for protecting the diesel particulate filter from thermal overheating after the regeneration process has started when the vehicle enters the self-control mode, wherein, in this case, the regeneration process is first verified, e.g., a check is carried out as to whether a regeneration process is already underway.

The control of the self-control mode can be adjusted on the basis of the monitoring results, for example, when predefined threshold values for the temperature of the diesel particulate filter or the exhaust gas emerging therefrom are reached.

If it is detected that a burning of soot in the diesel particulate filter is starting or has already intensified, the adjustment of the control can be directed, in particular, to bringing the oxygen concentration of the exhaust gas entering the diesel particulate filter to low values in order to reduce or interrupt the exothermic reaction resulting from the burning of the soot. Alternatively or additionally, the adjustment of the control can be directed to generating a sufficient exhaust gas volumetric flow rate, by which sufficient cooling of the diesel particulate filter during the regeneration can be achieved.

In another example a method for protecting a gasoline particulate filter from overheating and premature aging, wherein the gasoline particulate filter is disposed in an exhaust system of a gasoline engine of a motor vehicle, and wherein the motor vehicle has a self-control mode for autonomous control of a drive mode of the motor vehicle, includes starting the self-control mode, starting a regeneration process of the gasoline particulate filter with burning of the soot particulates adsorbed on the gasoline particulate filter, monitoring a temperature of the gasoline particulate filter and/or of the exhaust gas directed through the gasoline particulate filter during the regeneration process, and responsive to a monitoring result of the monitoring, adjusting a control of the self-control mode of the motor vehicle.

In this way, the regeneration process may be prepared (e.g., initiated) and/or controlled via adjusting of the self-control mode. The starting of the regeneration process can be prepared as often as necessary, e.g., by selecting an optimal speed and a suitable gear of the transmission, and can be initiated by a brief interruption of the gasoline supply, which can result in an excess of oxygen in the exhaust system at a high temperature and, therefore, can result in a commencement of the soot burning. This soot burning can then be monitored according to the method, for example, by monitoring the temperature of the gasoline particulate filter or the exhaust gas flowing out of said filter.

Similar to that stated above for the diesel particulate filter, the control of the self-control mode can be adjusted on the basis of the monitoring results, for example, when predefined threshold values for the temperature of the gasoline particulate filter or the exhaust gas emerging therefrom are reached.

If it is detected that a burning of particulates in the gasoline particulate filter is starting or has already intensified, the adjustment of the control can be directed, in particular, to bringing the oxygen concentration of the exhaust gas entering the gasoline particulate filter to low values in order to reduce or interrupt the exothermic reaction resulting from the burning of the soot. This can be achieved, for example, by supplying the gasoline engine with an essentially stoichiometric fuel-air mixture, which induces a combustion of the oxygen in the gasoline engine that is as complete as possible.

Alternatively or additionally, the adjustment of the control can be directed to generating a sufficient exhaust gas volumetric flow rate, by which sufficient cooling of the gasoline particulate filter during the regeneration can be achieved. Due to the high temperatures of the exhaust gas, this is effective only under certain conditions, however, specifically when the gasoline particulate filter temperature is higher than the exhaust gas temperature during the regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
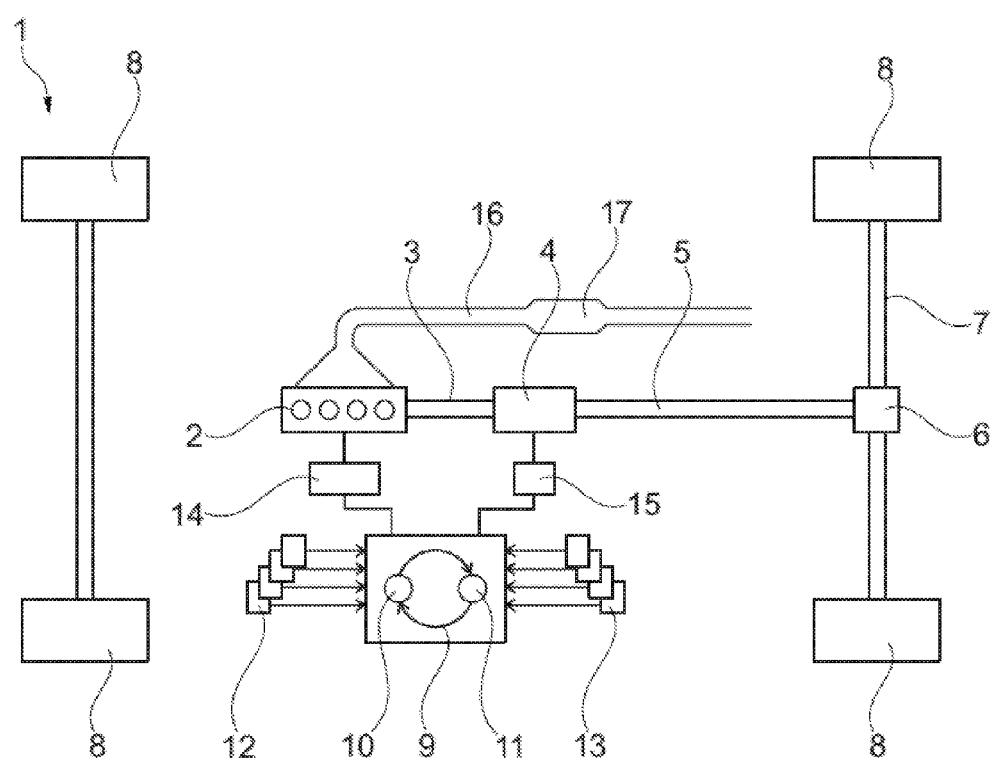
FIG. 1 shows an arrangement of relevant parts of a motor vehicle comprising an engine, a particulate filter, and a control device for the autonomous control of the motor vehicle.

Autonomous driving vehicles may be operated in a self-control mode, where vehicle controls are made automatically by the vehicle and not in response to operator input. During the self-control mode, particulate filter regeneration may be performed to burn off accumulated soot/particulate matter. Various aspects of the self-control may be adjusted during regeneration to control oxygen content and temperature of the exhaust gas, thus providing for efficient regeneration and avoiding over-temperature conditions that may degrade the particulate filter.

When adjusting the control parameters to increase regeneration efficiency and/or prevent thermal degradation during the self-control mode, the control parameters that are initially present or determined in the self-control mode can be used as the starting point.

The available control parameters can specify basic conditions, on the one hand, which are to be taken into account. For example, a maximum velocity limit and/or a specified route can be predefined as basic conditions that may not be modified by the method, since they have been specified, for example, by the driver, by a traffic control system, and/or by the traffic situation.

The available control parameters can also have degrees of freedom, however. For example, a route to be traveled can be specified at the discretion of the driver, whereas, e.g., a speed requirement, a specific selection of a gear of the vehicle transmission, specific acceleration and braking requirements or their change over time required to reach certain target speeds or spatial positions can be freely selected. Proceeding from a present driving situation, for example, there are multiple possibilities, e.g., for reaching the green phase of a traffic light located 50 m ahead.

Such control requirements can be stored with their basic conditions and degrees of freedom in a driving profile having any type or being formatted in any way. The driving profile can be used as the basis for the self-control and can be continuously dynamically adjusted with respect to the situation in and around the motor vehicle.

The adjustment of the control requirement as a function of the monitoring result, e.g., of the regeneration temperature, can be carried out within the framework of these degrees of freedom. Said adjustment can be directed to or work toward ensuring, for example, that a certain exhaust gas volumetric flow rate for cooling the particulate filter is maintained or a certain oxygen concentration in the exhaust gas directed to the particulate filter is not exceeded and/or the oxygen in the engine is consumed as completely as possible (in the case of a gasoline engine). As a result, an uncontrolled combustion reaction can be diminished or terminated and, therefore, an overheating, which could result in premature aging of the particulate filter, can be avoided. Therefore, the particulate filter is protected and its service life is extended.

In one embodiment, the adjustment of the control can change at least one parameter, wherein the parameter originates from a group comprising a gear to be used in a transmission of the motor vehicle, a speed to be reached by the motor vehicle, an acceleration and/or deceleration profile to be reached by the motor vehicle, an acceleration or braking gradient to be reached by the motor vehicle, a maximum interruption period of a fuel supply to the engine, and/or an interruption frequency of the fuel supply.

If the adjustment of the control requirement relates to a selection or change of the gear with which a rotational speed of the engine shaft is transmitted into a rotational speed of the transmission shaft or axle shaft, there is an option to select between a combination having a higher engine speed and a lower drive torque or a lower engine speed and a higher drive torque in order to achieve a specified propulsive power of the wheels. In this case, the engine speed, in particular, influences the exhaust gas volumetric flow carried off via the exhaust system and the particulate filter. In diesel engines, since the exhaust gas temperature in diesel engines is typically low as compared to a temperature present in the combustion process during the regeneration of the diesel particulate filter, the exhaust gas volumetric flow can be used for cooling the diesel particulate filter during the regeneration and, in particular, in the presence of intensified combustion. In gasoline engines, the engine speed influences the exhaust volumetric flow rate and the exhaust gas temperature. These can be selected in such a way that a regeneration process can be started, for example, by the high exhaust gas temperature, whereas, in an existing regeneration process, the temperature of the gasoline particulate filter can be cooled by the exhaust gas Specifically, therefore, when the gear for a requested speed or a torque demand is selected in the self-control mode for a diesel engine, a higher engine speed with a simultaneously lower torque can be selected when the temperature of the diesel particulate filter and/or the exhaust gas directed through the diesel particulate filter is as high or higher than the predefined threshold value. As a result, the exhaust gas volumetric flow rate can be increased or maintained at a higher level, whereby the combustion reaction within the scope of the diesel particulate filter regeneration can be kept under control. Therefore, the diesel particulate filter is protected, accelerated aging processes do not take place or are avoided, and the service life of the diesel particulate filter is extended.

When the gear for a requested speed or a torque demand is selected in the self-control mode for a gasoline engine, a higher engine speed with a simultaneously lower torque can be selected or, conversely, a lower engine speed with a higher torque, depending on whether the regeneration process is intended to be initiated, continued, or contained. As a result, the combustion reaction within the scope of the gasoline particulate filter regeneration can be kept under control. Therefore, the gasoline particulate filter is protected, accelerated aging processes do not take place or are avoided, and a service life of the gasoline particulate filter is extended.

If a requirement of the driving profile to be adhered to is merely a specified route, or if only a corridor to be maintained is specified with respect to the speed, then a speed to be actually specified can be determined by the self-control mode, or such a control can be adjusted within the scope of the method for protecting the particulate filter from thermal overheating. As a result, the power requirement on the engine is influenced and, therefore, so is the exhaust gas volumetric flow rate and/or exhaust temperature generated by the engine. As described above, said exhaust gas volumetric flow rate can be set as high as possible within the scope of the diesel particulate filter regeneration in order to cool and therefore control the associated combustion reaction and/or within the scope of the gasoline particulate filter, the regeneration can be controlled.

It is also possible to insert short phases of acceleration into the driving profile in order to interrupt relatively long time intervals of reduced fuel supply to the engine, in which a low exhaust gas volumetric flow is exclusively produced, which possibly may not suffice to keep the regeneration process under control. An elevated oxygen content could be provided in these time intervals, due to the low power requirement and the resultant interruption of the fuel supply. The regeneration process can be kept under control by short phases of acceleration.

In addition, provided there is a certain level of freedom to select the speed, the specified acceleration or deceleration profile can also be adjusted in respect of protecting the particulate filter from thermal overheating. In particular, deceleration phases (e.g., having a long-lasting low power demand and a resultant interruption in the fuel supply) can be avoided, which could be associated with an exhaust gas volumetric flow rate that is too low and/or an oxygen concentration in the exhaust gas that is too high. As a result, the combustion process of the exhaust gas regeneration can be thermally controlled.

If the adjustment of the control requirement relates to an acceleration and/or braking gradient to be achieved by the motor vehicle, said gradient can be selected—provided there is a high, in particular, critical temperature at the particulate filter or at the exhaust gas directed through the particulate filter—in such a way, for example, that an interruption of the fuel supply associated with the braking procedure, which can result in a high oxygen concentration in the exhaust gas, prevails only for a short time. Subsequently, the engine can be engaged again by accelerating briefly, in order to provide an elevated exhaust gas volumetric flow rate for cooling. In gasoline engines, such an acceleration may include a stoichiometric air-fuel ratio, thereby helping contain the combustion reaction.

In addition, the adjustment of the control can change and, in particular, reduce a specified maximum interruption period of a fuel supply to the engine in order to ensure that times of restricted fuel supply, in which an elevated oxygen concentration in the exhaust gas could intensify regeneration combustion, are kept as short as possible.

In addition, a maximum frequency at which the fuel supply to the engine is allowed to be interrupted can be specified. As a result of this as well, a recurrent provision of oxygen to the burning of the soot particulates can be regulated or halted, e.g., if this could cause the burning of the soot particulates to get out of control.

In particular, by influencing the driving profile and changing the control of the self-control mode, it is possible to avoid, for example, long braking phases having low exhaust gas flow and/or a high oxygen content in the exhaust gas, in order to not adversely affect and to extend the service life of the particulate filter and/or better control the burning of the soot particulates.

In a further variant, adjusting the control and/or changing the acceleration and/or deceleration profile can include inserting, into the control and/or into the acceleration and/or deceleration profile, a command to open the throttle for a limited time and to a limited extent, followed by refraining from opening the throttle for a limited time and to a limited extent.

The insertion of short phases of limited throttle-opening in alternation with halting the gas request during a deceleration is also referred to as "tip-in-cycling" and ensures, for example, that the engine will be started up cyclically, for example, in phases of low engine loads. As a result, phases of reduced or interrupted fuel supply to the engine are terminated, in which phases little fuel is combusted and the oxygen concentration in the exhaust gas is relatively high, while the exhaust gas volumetric flow rate is low. Especially in these phases, the combustion process within the scope of the particulate filter regeneration is at risk of getting out of control. As a result of the regular interruption, the engine starts up regularly, fuel is combusted, and, therefore, the oxygen concentration is reduced and, simultaneously, the exhaust gas volumetric flow rate is increased. Therefore, the insertion of tip-in cycling into a driving profile having low power requirements, for example, in heavy traffic, can further improve the protection of the particulate filter from thermal overheating.

In one example, the control can be adjusted and/or the acceleration and/or deceleration profile can be changed on the basis of at least one piece of information from a group including a piece of information exchanged between the motor vehicle and another motor vehicle, a piece of navigation information related to a route to be followed in the future, a piece of traffic information, a piece of traffic control information, an injection point for gasoline into the gasoline engine, and a temperature of a catalytic converter.

For example, the adjustment of the control can be dependent on the communication between vehicles located in the immediate surroundings in traffic events, wherein this information can be exchanged, e.g., wirelessly using any type of information protocol (vehicle-to-vehicle communication, V2V communication). As a result, the vehicle can be notified, for example, of vehicles that are located in the vicinity, but which are not yet visible to the driver or a camera. On the basis of such a piece of information, for example, an acceleration can be prevented if, e.g., a vehicle, which is located behind an obstacle and is not yet visible, is blocking the planned driving route.

Therefore, a piece of navigation information related to a route to be followed in the future can also be utilized for adjusting the driving profile or the control of the self-control mode. For example, if long, constant downhill driving is anticipated, in which only low engine power is demanded, it can be reasonable to interrupt, contain, or shift a regeneration process.

Correspondingly, a piece of traffic information such as a piece of information regarding a traffic jam up ahead or a smog warning can make it reasonable to interrupt, contain, or shift the regeneration process, since engine idling in the traffic jam is likely and is difficult to avoid. The same applies for traffic control information such as traffic light information, which can make it difficult to vary the driving profile in advance so that a regeneration process can be interrupted or shifted, if necessary.

An injection point for gasoline into the gasoline engine can also be taken into consideration, e.g., in respect of a temperature demand/setpoint of a catalytic converter, in such a way that this injection point can restrict the possible variations of the driving profile and, therefore, the control of the regeneration process.

In a further embodiment, as a result of the adjustment of the control requirement, a portion of oxygen in the exhaust gas directed through the particulate filter and/or the volumetric flow rate of the exhaust gas directed through the particulate filter can be varied.

As a result of the reduction of the oxygen concentration in the exhaust gas, the combustion process within the scope of the particulate filter regeneration can be contained, while, alternatively or simultaneously, an overheating in the particulate filter can be prevented by the elevated exhaust gas volumetric flow rate.

In a further example, the vehicle comprises an autonomously and/or electronically engageable clutch for coupling the wheels to a drive train having the engine. In addition, changing the control includes engaging or disengaging the wheels by the autonomously and/or electronically engageable clutch.

The autonomously engageable clutch can comprise, for example, an electronic clutch, which is also referred to as an "e-clutch". By use such an electronic clutch, a request for disengagement or engagement can be transmitted via an electronic signal to an actuator, which actuates the clutch.

As a result, for example, a long period of driving with a disengaged clutch, in which the diesel engine would quickly enter the idle mode and would operate for a relatively long time in the idle mode, can be avoided or interrupted by an electronic engagement of the clutch. This has the advantage that the oxygen concentration, which is high in the idle mode, combined with a simultaneously low exhaust gas volumetric flow rate—which could cause the combustion process during the regeneration to get out of control—can be avoided. Likewise, it is possible, in accordance with the indications on oxygen concentration and exhaust gas volumetric flow, to engage or disengage the engine as needed by the autonomously engageable clutch, for example during travel at a constant speed, thereby making it possible to vary between the idle mode and the engine mode in accordance with the demands. In addition, the engine can also be shut off with the clutch disengaged. An exhaust gas supply to the particulate filter would be interrupted as a result.

In another embodiment, the particulate filter can be combined and/or is combined with further catalyst stages. For example, the particulate filter can be combined with a NOx catalytic converter for selective catalytic reduction (SCR), whereby nitrogen oxides are preferably reduced and secondary reactions such as the oxidation of sulfur dioxide to sulfur trioxide are supported. In this embodiment, the driving profile can account for special basic conditions for the operation of the combined catalytic converter, in particular, the NOx catalytic converter.

A control device for the autonomous control of the motor vehicle in a self-control mode can be designed for monitoring, during the autonomous control, a combustion of soot particulates embedded in a particulate filter disposed in an exhaust system of an engine and, depending on a monitoring result of the monitoring, adjusting a control for the self-control mode of the motor vehicle.

The control device may be located, for example, in a separate on-board computer or control unit, or can be realized as part of an engine control and/or an autopilot. Said control device can be offered for use in motor vehicles having an engine and a particulate filter in order to protect the particulate filter in said motor vehicles and to increase its service life in accordance with the aforementioned operating principles.

FIG. 1 schematically shows relevant parts of a motor vehicle 1 having an internal combustion engine 2, which is coupled to the input of a clutch-transmission unit 4 via an engine output shaft 3. The clutch-transmission unit 4 is coupled via a transmission output shaft 5 to the input of the differential 6, the outputs of which are coupled via axle shafts 7 to two wheels 8 of the motor vehicle 1. The motor vehicle 1 also comprises a self-control device 9 for the autonomous control of a drive mode of the motor vehicle 1. The self-control device 9 can be in a self-controlling mode 10 or, alternatively, in a driver-controlled mode 11 and, therefore, can engage more or less actively in the vehicle control.

The self-control device 9 receives input signals from sensors 12 disposed so as to be distributed in the motor vehicle 1 and controls actuators 13 disposed in the motor vehicle 1, in particular, components of the motor vehicle 1 determining the driving behavior. In particular, the self-control device 9 can act on a mode of operation of an engine control unit 14 for controlling the engine 2 and on an electronic clutch 15 for controlling the clutch-transmission unit 4.

In addition, the motor vehicle 1 comprises an exhaust system 16 for collecting and carrying off combustion exhaust gases from the engine 2, wherein a particulate filter 17 is disposed in this exhaust system 16, downstream or upstream from which one or multiple catalytic converters—e.g., a 3-way catalytic converter—may optionally be disposed.

The engine 2 may be a diesel engine or a gasoline engine. Diesel engines may combust diesel fuel and as such may operate at lean air-fuel ratios (e.g., more oxygen than needed to combust the fuel) without the use of an external spark ignition device (e.g., combustion may occur due to combustion of the air-fuel mixture). Gasoline engines may combust gasoline or gasoline blends and as such may typically operate at stoichiometric air-fuel ratios (e.g., with only as much oxygen as needed to combust the fuel), with use of spark ignition to initiate combustion. When the engine is a diesel engine, the particulate filter may be referred to as a diesel particulate filter (DPF). When the engine is a gasoline engine, the particulate filter may be referred to as gasoline particulate filter (GPF).

Both DPFs and GPFs may be regenerated in order to burn off accumulated soot, by raising the temperature of the particulate filter and providing excess oxygen to the particulate filter. For DPFs, the temperature increase may include a rich operation (e.g., air-fuel ratio less than stoichiometric) period, due to the relatively cool exhaust of diesel engines during standard, lean operation, followed by lean operation. For GPFs, owing to the high temperature of the exhaust from the gasoline engine, the temperature of the GPF may not have to be purposely increased, but a period of lean operation may be induced to provide the excess oxygen for regeneration. Further, during regeneration of either of a DPF or GPF, introduction of additional oxygen or low exhaust gas flow may cause uncontrolled regeneration where undesirably high temperatures are reached that may degrade the respective particulate filter.

Thus, according to embodiments disclosed herein, the regeneration of a respective particulate filter may be controlled while in autonomous driving mode to control the temperature of the particulate filter, ensuring the target temperature for regeneration is reached in an efficient manner, without resulting in an over-temperature condition that may lead to degradation. Various parameters that may be controlled include a vehicle velocity profile (e.g., target speed, acceleration or deceleration rate), transmission gear, fuel cut-off status, clutch engagement, and throttle position.

In the motor vehicle 1 shown in FIG. 1, when the engine is a diesel engine, the method for protecting the diesel particulate filter from thermal overheating can be carried out, in particular, during a regeneration process of the diesel particulate filter.

After a start-up of the self-controlling mode 10, in which the motor vehicle 1 is controlled autonomously, i.e., without any particular intervention by the driver, by the self-control device 9, a start-up/verification of a regeneration process can be carried out for the diesel particulate filter, provided this is appropriate due to the state of the diesel particulate filter.

Subsequently, the method for protecting the diesel particulate filter from thermal overheating during the regeneration process can be carried out. As a result, the diesel particulate filter can be protected, for example, from thermal damage and premature aging resulting from a combustion of the soot located in the diesel particulate filter that is intensifying in an uncontrolled manner.

In particular, a monitoring of the temperature of the diesel particulate filter and/or of the exhaust gas directed through the diesel particulate filter can be carried out, on the basis of which a decision is made as to whether a continuation of the regeneration process is possible, for example, because the observed temperature of the diesel particulate filter has not yet exceeded a predefined threshold value. When the regeneration process is continued, the monitoring of the temperature can be carried out continuously again.

Alternatively, if the monitoring of the temperature of the diesel particulate filter has revealed that a temperature threshold has been exceeded, since a strong combustion is already taking place in the diesel particulate filter, an adjustment of a control parameter for the self-control mode can be carried out by the self-control device 9. In particular, a speed setpoint, a gear, an acceleration and/or deceleration profile to be achieved by the motor vehicle 1, and/or an acceleration and/or braking gradient to be achieved by the motor vehicle 1 can be changed or adjusted in this case. In addition, a maximum interruption period of a fuel supply to the diesel engine can also be specified, after which fuel is supplied to the diesel engine again.

In particular, by changing the control parameter of the self-control mode, a portion of oxygen in the exhaust gas directed through the diesel particulate filter and/or a volumetric flow rate of the exhaust gas directed through the diesel particulate filter may be varied or regulated. In addition, a decision can be made as to whether a continuation of the regeneration process is useful, or whether a termination of the regeneration process is appropriate, for example, in order to prevent an overheating or premature aging of the diesel particulate filter. After that, the method for protecting the diesel particulate filter can be terminated. Naturally, the method for protecting the diesel particulate filter can also be terminated when the regeneration is complete.

By way of the method, the self-control mode of the motor vehicle 1 can be utilized in order to carry out the regularly necessary regeneration phases of the diesel particulate filter in a controlled manner. In this case, the regeneration process can be thermally controlled by influencing the driving profile in the self-control. Overheating and premature aging can be avoided as a result. Therefore, the service life of the diesel particulate filter can be extended. Furthermore, fault memory entries resulting from overheatings of the diesel particulate filter can be avoided and service intervals can be extended. Overall, improved compliance with emission standards, which may even be stringent, can be achieved over the entire service life of the motor vehicle 1, while maintenance costs are reduced.

In the motor vehicle 1 shown in FIG. 1, when the engine is a gasoline engine, a method for protecting the gasoline particulate filter from thermal overheating, can be carried out, in particular, during a regeneration process of the gasoline particulate filter.

After a start-up of the self-controlling mode 10, in which the motor vehicle 1 is controlled autonomously, e.g., without any particular intervention by the driver or without any intervention at all by the driver, by the self-control device 9, a start-up of a regeneration process can be carried out for the gasoline particulate filter, provided this is appropriate due to the state of the gasoline particulate filter 17.

Subsequently, the method for protecting the gasoline particulate filter from thermal overheating during the regeneration process can be carried out. As a result, the gasoline particulate filter can be protected, for example, from thermal damage and premature aging resulting from a combustion of the soot located in the gasoline particulate filter that is intensifying in an uncontrolled manner.

In particular, a monitoring of the temperature of the gasoline particulate filter and/or of the exhaust gas directed through the gasoline particulate filter can be carried out, wherein a decision is made on the basis of the monitoring as to whether a continuation of the regeneration process is possible, for example, because the observed temperature of the gasoline particulate filter has not yet exceeded a predefined threshold value. When the regeneration process is continued, the monitoring of the temperature can be carried out continuously again.

Alternatively, if the monitoring of the temperature of the gasoline particulate filter has revealed that the continuation of the regeneration process is not useful or is even harmful, since strong combustion is already taking place in the gasoline particulate filter, an adjustment of a control parameter for the self-control mode can be carried out by the self-control device 9. In particular, a speed setpoint, a gear, an acceleration and/or deceleration profile to be achieved by the motor vehicle 1, and/or an acceleration and/or braking gradient to be achieved by the motor vehicle 1 can be changed or adjusted in this case. In addition, a maximum interruption period of a fuel supply to the gasoline engine can also be specified, after which fuel is supplied to the gasoline engine again.

In particular, the objective of changing the control parameter can be that of varying or regulating a portion of oxygen in the exhaust gas directed through the gasoline particulate filter and/or a volumetric flow rate of the exhaust gas directed through the diesel particulate filter, in particular that of reducing the oxygen content or varying the volumetric flow rate, in order to contain, interrupt, or control a regeneration taking place in the gasoline particulate filter. In addition, a decision can be made as to whether a continuation of the regeneration process is useful, or whether a termination of the regeneration process is appropriate, for example, in order to prevent an overheating or premature aging of the gasoline particulate filter. After that, the method for protecting the gasoline particulate filter can be terminated 26.

By way of the method, the self-control mode of the motor vehicle 1 can be utilized in order to carry out the regular regeneration phases of the gasoline particulate filter in a controlled manner. In this case, the regeneration process can be thermally controlled by influencing the driving profile in the self-control. Overheating and premature aging can be avoided as a result. Therefore, the service life of the gasoline particulate filter can be extended. Furthermore, fault memory entries resulting from overheatings of the gasoline particulate filter can be avoided and service intervals can be extended. In addition, the regular and monitored regeneration of the gasoline particulate filter can result in improved engine efficiency. A spatial size of the gasoline particulate filter can be reduced, since the storage capacity can be kept smaller due to the regular filter regeneration. Overall, improved compliance with emission standards, which may even be stringent, can be achieved over the entire service life of the motor vehicle 1 and the service life of the gasoline particulate filter can be extended, while maintenance costs are reduced.

Figure 2:
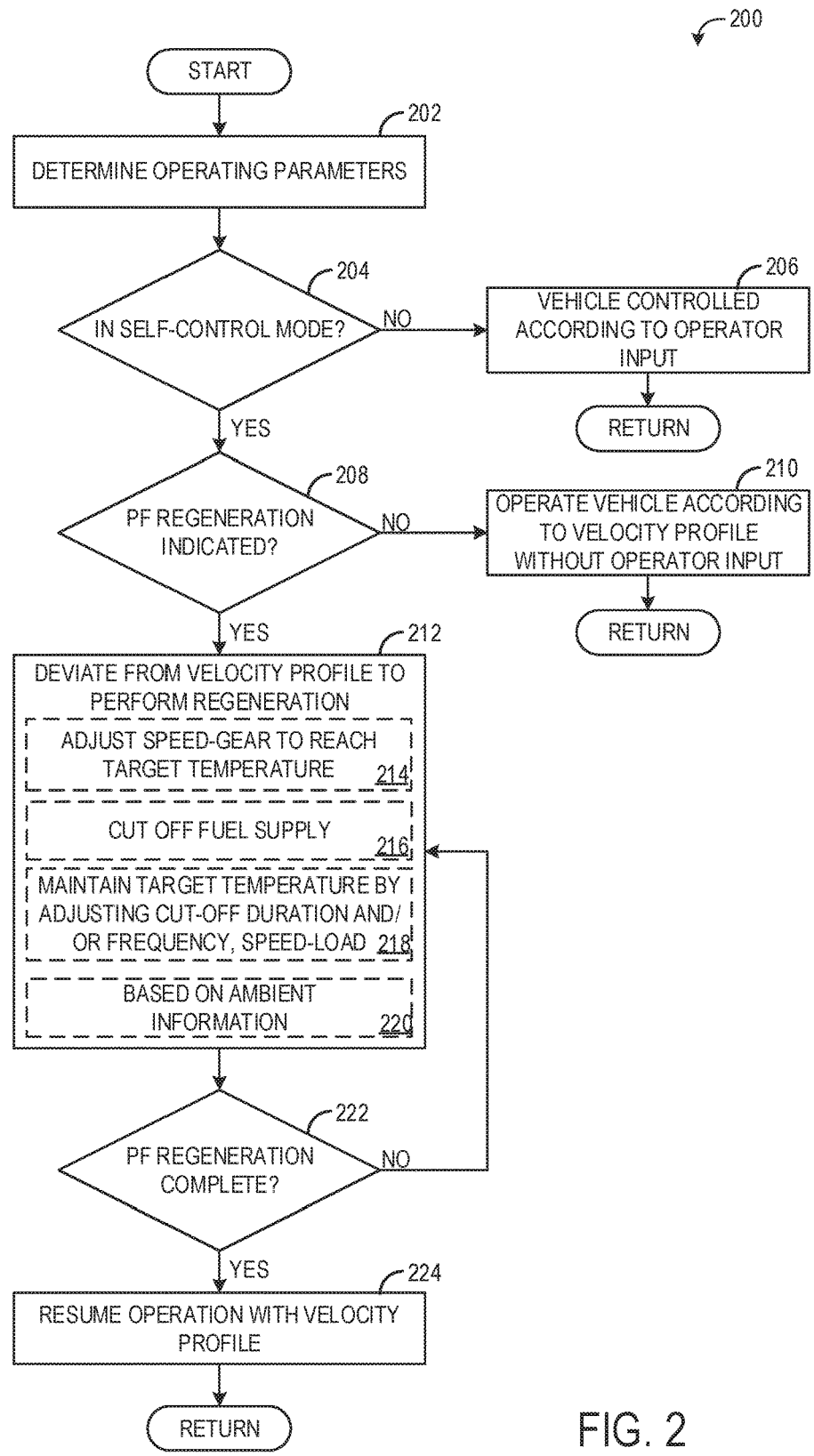
FIG. 2 shows a method for operating a vehicle.

Turning now to FIG. 2, a method 200 for operating a vehicle is illustrated. Instructions for carrying out method 200 and the rest of the methods included herein may be executed by a controller based on instructions stored on a memory of the controller, such as by engine control unit 14 and/or self-control device 9 of FIG. 1, in order to control regeneration of a particulate filter, such as particulate filter 17 of FIG. 1. The method may be performed by the controller in conjunction with signals received from sensors of the engine system, such as the sensors described above with reference to FIG. 1. The controller may employ engine actuators of the engine system to adjust engine operation, according to the methods described below. In one example, the self-control device may receive output from various sensors (e.g., engine speed sensor, vehicle speed sensor, radar or laser sensor that determines a distance to a preceding vehicle, etc.) and execute instructions to determine vehicle operating controls, such as vehicle speed. These vehicle operating controls may be sent to the engine control unit, which may then execute instructions to trigger various actuators responsive to the received vehicle controls, such as fuel injectors, a throttle, etc.

At 202, method 200 includes determining operating parameters. The determined operating parameters may include, but are not limited, engine speed and load, vehicle speed, distance to a preceding vehicle, particulate filter soot load, self-control mode status, and other parameters. At 204, method 200 determines if the vehicle is operating in the self-control mode. As explained previously, the self-control mode may include autonomous operation of the vehicle where certain vehicle controls normally controlled by the vehicle operator are instead controlled by the self-control device and/or engine control unit, such as vehicle speed, steering wheel position, braking, etc. The self-control mode may be activated by the vehicle operator.

If it is determined that the vehicle is not operating in the self-control mode, method 200 proceeds to 206 to control the vehicle according to operator input. This may include the operator controlling vehicle speed, including vehicle acceleration or deceleration, distance to other vehicles, vehicle position, route, transmission gear, and other vehicle parameters. Method 200 then returns.

If it is determined that the vehicle is operating in the self-control mode, method 200 proceeds to 208 to determine if particulate filter regeneration is indicated. Particulate filter regeneration may be indicated when the particulate/soot load on the particulate filter exceeds a threshold load. The particulate filter load may be determined based on output from a sensor (such as a particulate matter sensor or a pressure sensor positioned in the exhaust) or based on an estimated particulate load (e.g., based on a duration since a previous regeneration).

If it is determined that the particulate filter regeneration is not indicated, method 200 proceeds to 206 to control the vehicle according to a velocity profile, without operator input. The velocity profile may include various vehicle controls, such as vehicle speed, engine speed, acceleration, deceleration, fuel-cut off duration and/or frequency, transmission gear, and e-clutch status, by which the vehicle is controlled, while remaining under a maximum speed of the vehicle, above a minimum distance to a preceding vehicle, and/or following a route. The maximum speed, minimum distance, and route may all be specified in advance by the operator of the vehicle and/or based on ambient or navigational data, such as a vehicle limit for a current road on which the vehicle is operating. The vehicle controls specified in the velocity profile may be chosen by the self-control device to optimize fuel economy, and also may be optimized based on operator preference (e.g., from prior operator driving behavior). For example, the engine speed and transmission gear may be selected to maintain vehicle speed under the maximum speed and to maintain the vehicle at a greater distance than the minimum distance to a preceding vehicle. Further, to optimize fuel economy, the engine speed, transmission gear, e-clutch status, and/or fuel cut-off may be adjusted, for example the vehicle may be operated with periodic tip-ins followed by tip-outs, which may decrease fuel consumption relative to maintaining a steady engine speed and transmission gear. Method 200 then returns.

If it is determined at 208 that a particulate filter regeneration is indicated, method 200 proceeds to 212 to deviate from the velocity profile to perform the regeneration. A particulate filter regeneration may include operating the particulate filter at a target temperature, which may be a higher temperature than the particulate filter is operated at during non-regeneration conditions, as well as introducing additional oxygen to the particulate filter. In doing so, the particulate matter accumulated in the particulate filter may be combusted, thus regenerating the particulate filter. The temperature and oxygen content of the particulate filter may be controlled over the course of the regeneration (and in some examples, also upon completion of the regeneration) to ensure efficient regeneration without the temperature of the particulate filter exceeding an upper threshold temperature where degradation to the particulate filter may occur. To bring and/or maintain the particulate at the target temperature and/or provide the desired oxygen for regeneration, the vehicle may be controlled by the self-control device and/or engine control unit, while in the self-control mode, by deviating from the velocity profile.

Deviating from the velocity profile may include adjusting the vehicle speed, engine speed, and/or transmission gear to reach the target temperature, as indicated at 214. For example, choice of transmission gear may result in a demanded wheel power being reached with either a higher engine speed-lower engine load or a lower engine speed-higher engine load. Higher engine speeds may result in higher exhaust gas volumes and hence lower particulate filter temperatures, while higher engine loads may result in hotter exhaust gas and higher particulate filter temperatures.

Deviating from the velocity profile may include cutting off the fuel supply, as indicated at 216. In one example, the fuel supply may be cut off once the target particulate filter temperature has been reached, in order to increase the oxygen concentration of the exhaust gas to initiate the regeneration. In other examples, for example in diesel engines, the fuel supply may not be cut-off in order to increase the oxygen content, as the exhaust may already be suitably lean, but instead may be cut-off to reduce the temperature of the filter, or the fuel supply may be maintained.

Deviating from the velocity profile may further include maintaining the target temperature by adjusting the cut-off duration and/or frequency, the engine speed, the vehicle speed, and/or gear, as indicated at 218. Maintaining the target temperature may include adjustments made to ensure the temperature does not get too low (where regeneration efficiency may be comprised) as well as adjustments made to ensure the temperature does get too high, where degradation may occur. Thus, to increase the temperature if the temperature gets too low, the fuel cut-off duration or frequency may be decreased so that additional fuel is supplied to the engine, increasing exhaust temperature. However, this may cause the oxygen to decrease, which may also effect regeneration efficiency. The engine load may be increased (by adjusting the transmission gear, for example) to increase exhaust temperature in another example, or the vehicle setpoint speed may be increased to increase exhaust temperature. To decrease the filter temperature if the temperature gets too high, the engine speed may be increased (to increase the exhaust gas volume, which may cool the filter), engine load may be decreased, and/or the fuel cut-off duration or frequency may be increased.

Further, in some examples as explained above, the velocity profile may include operating with cycling tip-ins, which may decrease fuel consumption. Deviating from the velocity profile may include adjusting the duration or frequency of the cycling tip-ins. Further still, deviating from the velocity profile may include adjusting vehicle acceleration or deceleration, for example an increase in vehicle speed to a setpoint speed may be carried out rapidly (e.g., high acceleration) or it may be carried out slowly (e.g., low acceleration), to control the particulate filter temperature.

In some examples, deviating from the velocity profile may be performed based on ambient information, such as traffic conditions, road conditions, or other information, as indicated at 220. For example, if traffic conditions indicate that an extended idle operation is anticipated, the regeneration may be delayed until traffic conditions indicate higher vehicle speed conditions are anticipated.

At 222, method 200 determines if the particulate filter regeneration is complete, for example based on sensor output or based on a duration of the regeneration. If the regeneration is not complete, method 200 continues to deviate from the velocity profile to carry out the regeneration. If the regeneration is complete, method 200 proceeds to 224 to resume operation the velocity profile in its original, undeviated form. Method 200 then returns.

Thus, method 200 performs a controlled particulate filter regeneration during a self-control mode, where the vehicle is operated without explicit operator input. In doing so, various aspects of the vehicle control, such as engine speed, engine load, acceleration level, etc., may be adjusted to maintain the particulate filter at a target temperature (e.g., 600 degrees C.) and provide desired oxygen for regeneration. During regeneration, the vehicle may be controlled in a manner to still meet certain operator-specified parameters, such as maximum vehicle speed and a minimum distance to a preceding vehicle, while other parameters may be adjusted away from predetermined or optimized controls. These adjustments, such as to vehicle speed, may be performed independent of other vehicles or road conditions. For example, as long as the minimum distance to a preceding vehicle is maintained, vehicle speed may be adjusted without taking into account the distance to a preceding vehicle, e.g., the speed may be adjusted even if no other vehicle is present.

The method may be performed in a vehicle with a diesel engine or in a vehicle with a gasoline engine, or other suitable engine (e.g., dual fuel). In examples where the method is performed in a vehicle with a diesel engine, certain aspects of the method may differ than when the method is performed in a vehicle with a gasoline engine, as explained below.

When a DPF regeneration is initiated, a high load of soot is present on the filter. During the DPF regeneration, the filter temperature is controlled to an already relatively high temperature to enable soot burning. Under normal driving conditions, a drop to idle leads to the exposure of the filter to high concentrations of oxygen. This can suddenly increase the soot burning rate on the filter, leading to uncontrolled exotherms and overheating of the filter. This occurs when the exhaust flow is not high enough to cool down the catalyst.

The self-control mode allows autonomous driving to control the combustion engine speed and load by controlling the transmission gear choice, thus allowing for a demanded wheel power to choose for a higher engine speed-lower load or lower engine speed-higher load combination. Engine speed influences exhaust volume flow, engine load influences catalyst temperature. The exact vehicle speed setpoint and so the power demand on the engine may also be controlled and with that also the heat sent to the exhaust.

The operation in autonomous mode may protect for long decelerations phases at low exhaust flow in order to extend the lifetime of the DPF. When braking is needed, the deceleration gradient may be controlled to limit the fuel cut-off time and so the time of high oxygen concentration exposure. In dense traffic, the length of deceleration vs. tip-in cycling may also be controlled. In the case that the vehicle includes an e-clutch, the engine could be decoupled from the wheels during relatively steady driving, diminishing the inertia for the engine and so creating a faster drop to idle.

Gasoline particulate filters store engine out soot (typically with a high efficiency). Regenerating a GPF includes a target temperature (typically around 600° C.) and an excess of oxygen supplied upstream the filter. With a gasoline engine, the standard operating temperature in the exhaust is quite high. Any fuel cut event with temperatures above 600° C. will lead to significant soot burning in the catalyst.

The self-control mode during regeneration of GPF uses the autonomous driving mode to control fuel cut-off frequency and duration from the combustion engine and target temperature of the GPF. During the autonomous mode, the control of the combustion engine speed and load occurs for example by acting on the vehicle speed profile and gear choice. Examples of actions taken in case of a GPF regeneration are controlling the target temperature by acting on the slope of accelerations and decelerations, controlling the target temperature by acting on the vehicle speed setpoint, and controlling the frequency and duration of fuel cut-off phases.

In doing this the control could also be further optimized by taking into account information from V2-V or vehicle-to-vehicle interaction (wireless information exchange between vehicles), knowing the future route, traffic information, traffic light information, and pre-control of the fuel injection for heating based on modelled/projected temperature of that desired in the catalyst in comparison to the temperature condition.

The self-control (autonomous driving) mode system assists the fuel cut-off periods by preparing the GPF regeneration by choosing the optimum vehicle speed-gear combination for controlling the target temperature. Once prepared, the fuel can be cut-off, supplying oxygen excess upstream the GPF, enabling the soot burning from the filter. The autonomous mode allows the system to optimize the combustion engine speed-load combination (via the vehicle speed-gear) for maximum regeneration efficiency (this allows to control the volume flow), so to influence the amount of oxygen supplied and to protect for aging (due to too much oxygen).

The fuel cut-off duration and frequency can be controlled by the autonomous mode to maintain the GPF's target temperature. It can be alternated with short periods of stopping the GPF regeneration temporarily and the exothermic reaction by switching on the combustion of a stoichiometric mixture, so there is no oxygen excess available for soot combustion, and controlling engine speed-load combination to increase/decrease to target temperature. The whole process of preparing the fuel cut-off and execution of it can be repeated as much as is needed for optimal GPF regeneration.

Figure 3:
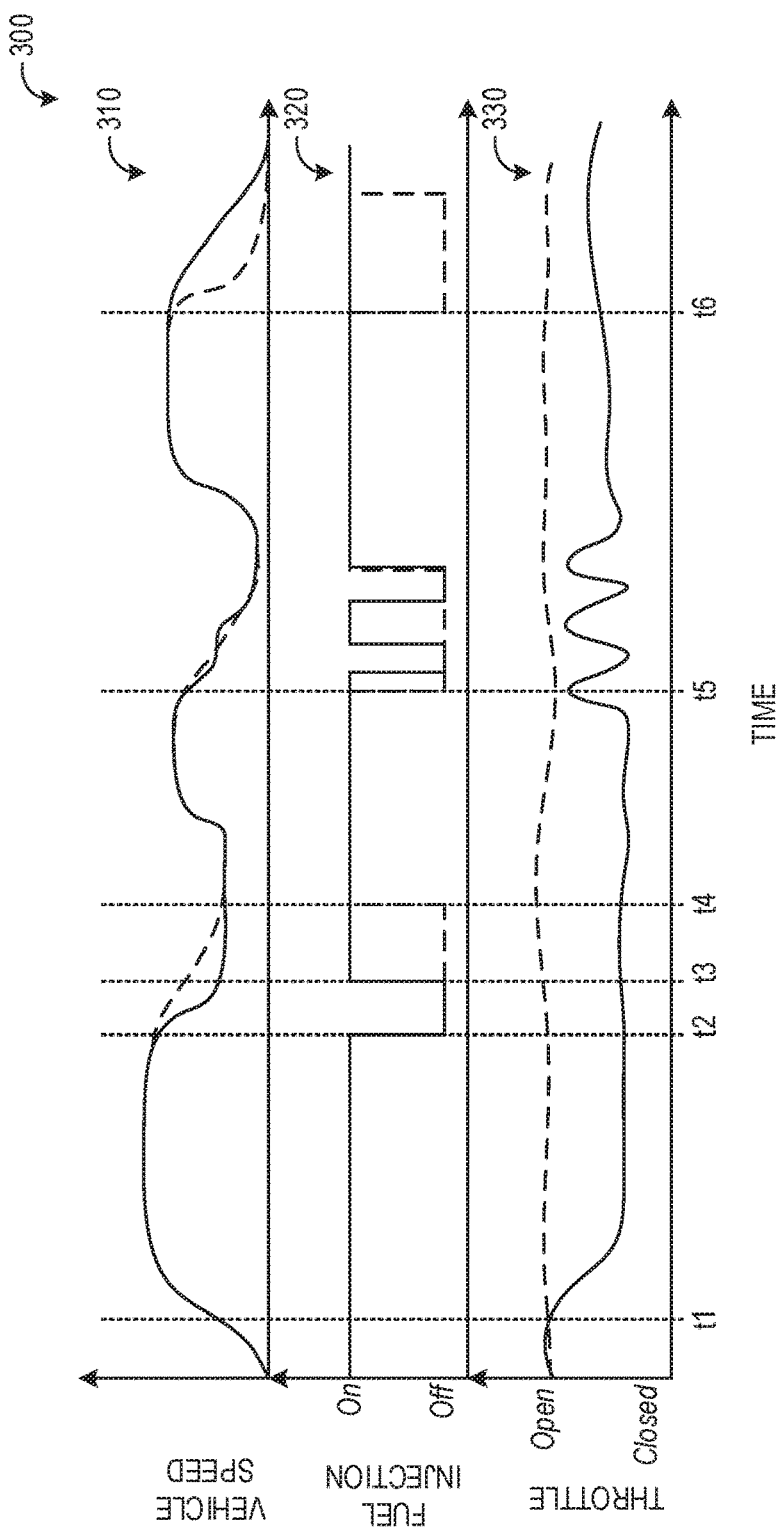
FIGS. 3 and 4 show example operating parameters that may be observed during execution of the method of FIG. 2.
Figure 4:
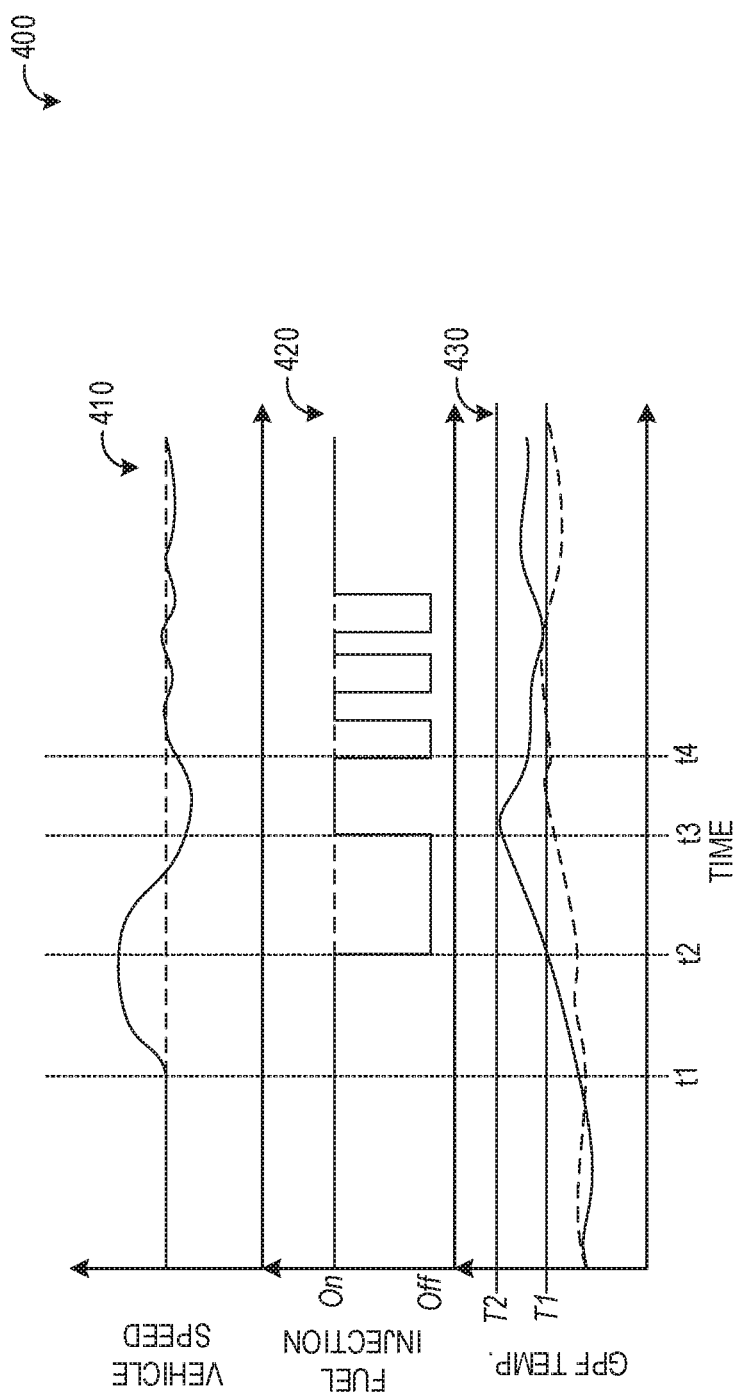

FIGS. 3 and 4 are diagrams showing example operating parameters of interest that may be observed during execution of the method of FIG. 2. FIG. 3 shows a diagram 300 of operating parameters that may be observed when the method is executed in a vehicle that includes a diesel engine. FIG. 4 shows a diagram 400 of operating parameters that may be observed when the method is executed in a vehicle that includes a gasoline engine.

Referring first to diagram 300 of FIG. 3, it shows three operating parameters of interest, vehicle speed (plot 310), fuel injection status (plot 320), and throttle position (plot 330), each plotted as a function of time. The operating parameters are shown during operation in the self-control mode, for both a first example operation where regeneration is performed (where each parameter is shown by a solid curve) and a second example operation where regeneration is not performed (where each parameter is shown by a dashed curve). It is to be understood that the two example operations are not performed simultaneously, but are overlaid for clarity.

Prior to time t1, for both the first example and the second example, fuel injection is being performed, the throttle is open, and the vehicle speed is controlled to be increasing up to a setpoint speed. At time t1, a regeneration operation is indicated for the first example operation. To perform the regeneration, the throttle may be closed to increase the heat in the exhaust and initiate regeneration. Thus, as shown by plot 330, the throttle for the first example operation is moved to a more closed position, while the throttle for the second example operation is maintained open. The exhaust may include sufficient oxygen to carry out the regeneration, due to the engine being a lean burn engine. Other methods for increasing the temperature of the DPF are possible, such as adjusting fuel injection timing.

At time t2, a vehicle braking operation is performed, for example due to a reduction in the speed limit on the road on which the vehicle is traveling or due to the presence of a slower-moving preceding vehicle. When regeneration is not performed, the self-control mode controls may execute a relatively slow deceleration, as shown by the dashed line of plot 310. Therein, the vehicle speed may reduce over the time from t2-t4. During this deceleration, the fuel supply may be stopped, as shown by the dashed line of plot 320. By turning off fuel injection while the vehicle is decelerating, fuel consumption may be increased.

However, when fuel injection is shut off, the amount of oxygen in the exhaust increases. While this increased amount of oxygen may not be an issue during standard, non-regenerating conditions, it may be cause the DPF to increase to an undesirable temperature during regeneration. Hence, the self-control mode profile that is executed for the second example may be adjusted so that the duration of the fuel injection cut out is reduced. As shown by the solid line of plot 310, a rapid deceleration event occurs from time t2-t3. The rapid deceleration may be induced by uncoupling the wheels from the engine (e.g., via an e-clutch), shifting gears, applying the brakes with more force, or other suitable mechanism. Once the engine speed reaches idle speed, for example, the fuel injection may be resumed to avoid a vehicle stall. As a result, the duration of the fuel cut off is shortened, for example from time t2-t3.

At time t5, another deceleration event occurs. Again, as shown by the dashed line of plot 320, the standard, non-regeneration self-control profile includes a steady deceleration with fuel injection cut off during the duration of the deceleration (as shown by the dashed line of plot 320). To prevent the excess of oxygen during the deceleration, the self-control mode profile may be adjusted in the example where regeneration is occurring. In this instance, a number of cycling tip-ins are performed, where the throttle is opened and then closed, as shown by the solid line of plot 330. Each time the throttle is closed, fuel injection may be cut off, while the fuel injection may be resumed when the throttle is opened, as shown by the solid line of plot 320. In this way, the extent of the fuel cut outs may be lessened, while still providing enough oxygen to sustain the regeneration. The vehicle speed may fluctuate slightly during the cycling tip-ins, as shown by the solid curve of plot 310.

At time t6, a further deceleration event occurs. Unlike the first deceleration event, the rate of deceleration may be decreased in the first example where regeneration is occurring, relative to the rate of deceleration in the second example where regeneration is not occurring. As shown by the dashed lines of plots 310 and 320, when regeneration does not occur, the deceleration carried out according to the self-control mode profile may rapid and may include a duration of fuel injection cut out. The rate of deceleration may be adjusted when regeneration is being performed, as shown by the solid curve of plot 310, so that the deceleration occurs more slowly. Further, the vehicle may be downshifted relative to the transmission gear that is used in self-control mode profile without regeneration. In doing so, fuel injection cut out may be avoided altogether, as shown by the solid curve of plot 320.

The decision as to whether to increase or decrease the rate of deceleration may be based on one or more suitable conditions. For example, if the regeneration is over or nearly over, the DPF may not require oxygen to sustain regeneration, and thus it may be preferable to avoid fuel cut out as much as possible, and thus a slower deceleration to avoid fuel cut out may be performed. In another example, the amount of vehicle speed that needs to be sustained may dictate whether a fast or slow deceleration is performed.

Referring next to diagram 400 of FIG. 4, it shows three operating parameters of interest, vehicle speed (plot 410), fuel injection status (plot 420), and GPF temperature (plot 430), each plotted as a function of time. The operating parameters are shown during operation in the self-control mode, for both a first example operation where regeneration is performed (where each parameter is shown by a solid curve) and a second example operation where regeneration is not performed (where each parameter is shown by a dashed curve). It is to be understood that the two example operations are not performed simultaneously, but are overlaid for clarity.

Prior to time t1, no regeneration is indicated and so both example operations are operating at a set vehicle speed, with fuel injection on, and with GPF temperature below a first threshold, T1. At time t1, a GPF regeneration is indicated (for the first example operation). As such, as shown by the solid curve of plot 410, the self-control mode profile is adjusted to increase the vehicle set speed. In doing so, as shown by the solid curve of plot 430, the GPF temperature increases to above the first threshold temperature, T1. At this point, the GPF is prepared for regeneration and fuel injection is cut off at time t2, as shown by the solid curve of plot 420. In contrast, fuel injection may be maintained on in the self-control mode profile when no regeneration is performed. Owing to the fuel cut out, additional oxygen is provided to the GPF and regeneration begins, resulting in an increase in the GPF temperature.

At time t3, GPF temperature in the first example where regeneration is being performed reaches a second threshold temperature, T2. As a result, the fuel cut off is terminated so that stoichiometric combustion may resume, which lowers the oxygen content of the exhaust gas and may temporarily halt regeneration, allowing the GPF temperature to decrease, as shown by the solid curve of plot 430. Once GPF temperature is suitably decreased, for example at time t4, fuel cut out is again performed. The fuel cut out may be controlled (e.g., switched on and off) to maintain GPF temperature above the first threshold but below the second threshold. In doing so, regeneration may be performed without degrading the GPF. During the oscillating fuel cut out operations, vehicle speed may fluctuate slightly, as shown by the solid curve of plot 410, relative to the vehicle speed that is maintained when no regeneration is performed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for protecting a diesel particulate filter from overheating and premature aging, wherein the diesel particulate filter is disposed in an exhaust system of a diesel engine of a motor vehicle, and wherein the motor vehicle has a self-control mode for autonomous control of a drive mode of the motor vehicle, comprising:
   starting the self-control mode, the self-control mode including controlling a plurality of parameters of the motor vehicle without operator input,
   starting a regeneration process of the diesel particulate filter with burning of soot particulates adsorbed on the diesel particulate filter by adjusting one or more of the plurality of parameters of the motor vehicle,
   determining that a temperature of the diesel particulate filter and/or of exhaust gas directed through the diesel particulate filter exceeds a threshold temperature during the regeneration process, and responsive to the temperature of the diesel particulate filter and/or of the exhaust gas directed through the diesel particulate filter exceeding the threshold temperature, cutting off a fuel supply to the diesel engine.

2. The method as claimed in claim 1, wherein the adjustment of the one or more of the plurality of parameters changes at least one of:
   a gear to be used in a transmission of the motor vehicle,
   a speed to be reached by the motor vehicle,
   an acceleration and/or deceleration profile to be achieved by the motor vehicle,
   an acceleration and/or deceleration gradient to be achieved by the motor vehicle, and
   a maximum interruption period of the fuel supply to the diesel engine, while maintaining the speed of the motor vehicle below a maximum speed and maintaining a distance to a preceding vehicle at a distance that is greater than a minimum distance.

3. The method as claimed in claim 2, wherein adjusting the acceleration and/or deceleration profile includes inserting, into the acceleration and/or deceleration profile, an indication to open a throttle for a period of time and to open the throttle to a given extent, followed by refraining from opening the throttle.

4. The method as claimed in claim 1, wherein, as a result of the adjustment of the one or more of the plurality of parameters of the motor vehicle, a volumetric flow rate of the exhaust gas directed through the diesel particulate filter is varied and/or the temperature of the diesel particulate filter and/or of the exhaust gas directed through the diesel particulate filter is varied.

5. The method as claimed in claim 1, wherein the motor vehicle comprises an autonomously and/or electronically engageable clutch for coupling wheels to a drive train coupled to the diesel engine, and adjusting the one or more of the plurality of parameters of the motor vehicle includes engaging or disengaging the wheels by the autonomously and/or electronically engageable clutch.

6. The method as claimed in claim 1, wherein the diesel particulate filter is combined with further catalyst stages.

7. A method for protecting a gasoline particulate filter from overheating and premature aging, wherein the gasoline particulate filter is disposed in an exhaust system of a gasoline engine of a motor vehicle, and wherein the motor vehicle has a self-control mode for autonomous control of a drive mode of the motor vehicle, comprising:
   starting the self-control mode, the self-control mode including controlling a plurality of operating parameters of the motor vehicle without operator input,
   starting a regeneration process of the gasoline particulate filter with burning of soot particulates adsorbed on the gasoline particulate filter by adjusting one or more of the plurality of operating parameters of the motor vehicle,
   responsive to a temperature of the gasoline particulate filter and/or of exhaust gas directed through the gasoline particulate filter reaching a target temperature during the regeneration process, cutting off a fuel supply to the gasoline engine,
   maintaining the temperature of the gasoline particulate filter and/or of the exhaust gas directed through the gasoline particulate filter at the target temperature during the regeneration process by adjusting a duration and/or frequency of the cut-off of the fuel supply, and during the regeneration process, adjusting acceleration of the motor vehicle based on the temperature of the gasoline particulate filter and/or of the exhaust gas directed through the gasoline particulate filter, the acceleration adjusted in the self-control mode without operator input.

8. The method as claimed in claim 7, wherein adjusting one or more of the plurality of operating parameters of the motor vehicle comprises adjusting at least one of:
   a gear to be used in a transmission of the motor vehicle,
   a speed to be reached by the motor vehicle,
   an acceleration and/or deceleration profile to be achieved by the motor vehicle, and
   an acceleration and/or deceleration gradient to be achieved by the motor vehicle, while maintaining the speed of the motor vehicle below a maximum speed and maintaining a distance to a preceding vehicle at a distance that is greater than a minimum distance.

9. The method as claimed in claim 8, wherein adjusting one or more of the plurality of operating parameters comprises opening a throttle to a given position for a period of time, followed by refraining from opening the throttle, followed by opening the throttle to the given position for the period of time, followed by refraining from opening the throttle.

10. The method as claimed in claim 8, wherein adjusting one or more of the plurality of operating parameters of the motor vehicle comprises adjusting one or more of the plurality of operating parameters based on at least one of:
    information exchanged between the motor vehicle and another motor vehicle,
    navigation information relating to a route to be followed in the future,
    traffic information,
    traffic control information,
    an injection point for gasoline into the gasoline engine, and
    a target temperature of a catalytic converter.

11. The method as claimed in claim 7, wherein, as a result of the adjusting, a volumetric flow rate of the exhaust gas directed through the gasoline particulate filter is varied and/or the temperature of the exhaust gas directed through the gasoline particulate filter is varied.

12. The method as claimed in claim 7, wherein the motor vehicle comprises an autonomously and/or electronically engageable clutch for coupling wheels to a drive train coupled to the gasoline engine, and adjusting the one or more of the plurality of operating parameters includes engaging or disengaging the wheels by the autonomously and/or electronically engageable clutch.

13. A method, comprising:
    operating a vehicle according to a velocity profile that controls at least vehicle speed to remain under a maximum set vehicle speed and maintain the vehicle at or greater than a minimum distance to a preceding vehicle, the vehicle operated according to the velocity profile without operator input; and
    deviating from the velocity profile responsive to a regeneration of a particulate filter of the vehicle.

14. The method of claim 13, wherein the velocity profile further controls one or more of an acceleration rate, a deceleration rate, and fuel cut-off duration and/or frequency, and wherein the velocity profile is generated based in part on conditions predefined by an operator.

15. The method of claim 14, wherein deviating from the velocity profile comprises adjusting one or more of the vehicle speed, the acceleration rate, the deceleration rate, and the fuel cut-off duration and/or frequency to maintain a target particulate filter temperature and/or a target exhaust gas oxygen concentration.

16. The method of claim 15, wherein deviating from the velocity profile further comprises engaging or disengaging wheels of the vehicle via an autonomously and/or electronically engageable clutch.

17. The method of claim 15, wherein deviating from the velocity profile comprises deviating from the velocity profile regardless of a distance to the preceding vehicle when the distance is greater than the minimum distance.

18. The method of claim 13, wherein the velocity profile further controls a transmission gear, and wherein deviating from the velocity profile comprises adjusting the transmission gear.

* * * * *